United States Patent [19]

Gaddi

[11] Patent Number: 4,830,133
[45] Date of Patent: May 16, 1989

[54] VEHICLE WITH REDUCIBLE OVERALL DIMENSIONS

[76] Inventor: Bruno Gaddi, Viale Giovanni Pisano, 60, 56100 Pisa, Italy

[21] Appl. No.: 101,594

[22] Filed: Sep. 28, 1987

[51] Int. Cl.[4] .............................................. B62K 15/00
[52] U.S. Cl. .................................... 180/208; 280/278; 280/287
[58] Field of Search ................ 180/208; 280/278, 287, 280/641, 646

[56] References Cited

U.S. PATENT DOCUMENTS

| | | | |
|---|---|---|---|
| 145,147 | 12/1873 | Bingham et al. .................. | 280/43.21 |
| 184,629 | 11/1876 | King ................................... | 280/43.21 |
| 2,812,188 | 11/1957 | Rusch ................................. | 280/641 |
| 3,572,757 | 7/1968 | Camps ................................ | 180/208 |
| 4,054,300 | 10/1977 | Winchell ........................... | 280/278 |

*Primary Examiner*—Charles A. Marmor
*Assistant Examiner*—Karin Tyson
*Attorney, Agent, or Firm*—Shlesinger, Fitzsimmons & Shlesinger

[57] ABSTRACT

A two or three-wheeled vehicle, motorized or not, in which the handle-bar and the front fork are hinged to the steering hub so that they can be upset from their normal operative position to a contracted vehicle position reduced in overall dimensions, in which the front wheel center is put underneath the frame front part and the handle-bar is upset in an essentially horizontal way, so reducing the vehicle overall dimensions in length and in its front part height.

5 Claims, 5 Drawing Sheets

VEHICLE WITH REDUCIBLE OVERALL DIMENSIONS

The present invention concerns a two or three-wheeled vehicle, motorized or not, having a folded structure so that the overall dimensions can be reduced when not in use.

The invention refers to all the vehicles having a single front steering-wheel, thus as bicycles, motorized bicycles, motor-cycles and three-wheeled vehicles.

The invention is illustrated and described herein on with reference to a light motor cycle - motorized bicycle, as in this instance the difficulties to overcome are superior to those encountered for a bicycle and as the system is less important for big motor-cycles. The bicycle is therefor the other important receiving of the invention.

The prior art has proposed different solutions in order to obtain a motor vehicle overall dimensions reduction: the problem is made more complicated by even antithetic requirements of such a vehicle. For a satisfactory solution of the problem it is necessary that the vehicle may be reduced both in height and in length; the vehicle in position reduced in dimension must keep the motor and gas tank trim substantially unchanged respective of the normal use positions, in order to avoid gas spillages.

It is further necessary that the operations required of the user to reduce or restore the vehicle overall dimensions be simple, realizable and such as not to require excess efforts, and the vehicle must show at last an exceptional appearance of stability and safety and aesthetics and a seating capacity not penalized by its dimensionally reducible structure.

It has been proposed for instance to carry out vehicles where a possibility of reduction in height, by handle-bar and saddle folding is foreseen, without reduction in length: by this solution it's possible to obtain a vehicle having really reduced overall dimensions only if it's realized with a very reduced pitch and this heavily penalizes the vehicle stability.

In order to obtain a vehicle or reducible length it has been proposed to realize a frame hinged as a quadrilateral, to allow for some folding. This solution results in a rather complex construction and has a chiefly negative effect on the way the vehicle looks. Also the solution proposed in the past foreseeing the possibility of removing the motor from a frame, the latter being subsequently foldable is unacceptable because of excessively complicated manipulations that are necessary for vehicle reduction.

The object of the invention is therefore to propose a vehicle that can be reduced both in length and in height by simple manoeuvres, having a satisfactory look, good stability and seating capacity.

According to the invention this is obtained carrying out a vehicle including a frame to which a steering hub is frontally supported in rotatable way, and characterized by the fact that there are foldably connected to said hub for pivotal movement about an axis transverse to the hub rotating axis and parallel to the front wheel axis a front wheel supporting fork and a handle-bar, the fork when folded carrying the front wheel towards the vehicle center, and the handle-bar when folded being placed in a substantially horizontal position.

To make better clear the purposes and the characteristics of the present invention an exemplifying form of embodiment will be here described illustrated by the enclosed drawings where:

Figure 4:
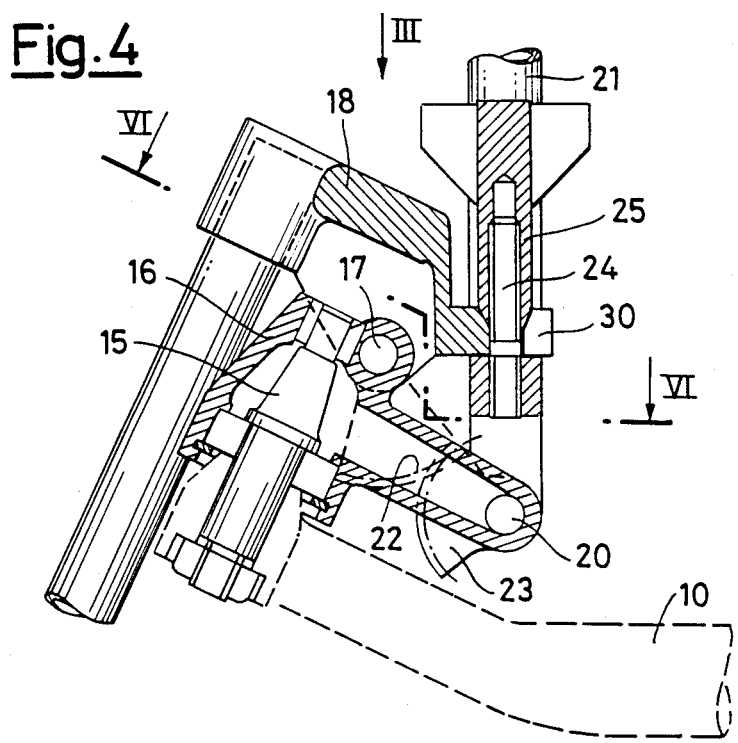
FIGS. 4 and 5 are sectional views along the plane of trace IV—IV indicated in FIG. 3, in different operative positions.

According to the invention the vehicle includes a frame 10 to which is supported at 11 a motor-wheel group 12 conventional in itself and of unimportant configuration. In the scheme shown here the motor-wheel group is hinged as 11, to provide a spring suspension of the rear wheel, which is supported by the swinging arm 13; nevertheless any other type of rear wheel and motor suspension can be adopted without particular limitations. The vehicle shows mounted at the front frame end a steering spindle 15 as better shown in FIG. 4, on which a steering hub 16 is rotating. To the hub 16 is hinged as at 17 a fork 18 that supports front wheel 19, and that according to prior art can incorporate a conventional suspension system.

To the same support 16 is hinged as at 20 the lower end of the dual handle-bar 21. On the upper end of fork 18 head is mounted a toothed sector 22 that meshes with a corresponding toothed sector 23 fixed to the lower end of handle-bar 21. Projecting upwardly from the lower end of the handle-bar is a screw 24 which receives a wing nut 25; and on the fork 18 is formed a bifurcated protrusion 29 with an open slot 30 through which penetrates the screw 24 when the vehicle is in the operative position depicted in FIG. 4, and in which position the lower end of unit 25 engages in the lower end of unit 30 so as to lock the handle-bar and fork in their upright or operative positions. This direct connection between the handle-bar and fork results in a particularly effective means for locking the parts.

To the frame 10 is further supported at 31 a saddle 33 on support member 32.

The vehicle operation according to the invention, explained in the drawings, is easily understandable by the examination of the very drawings.

Figure 1:
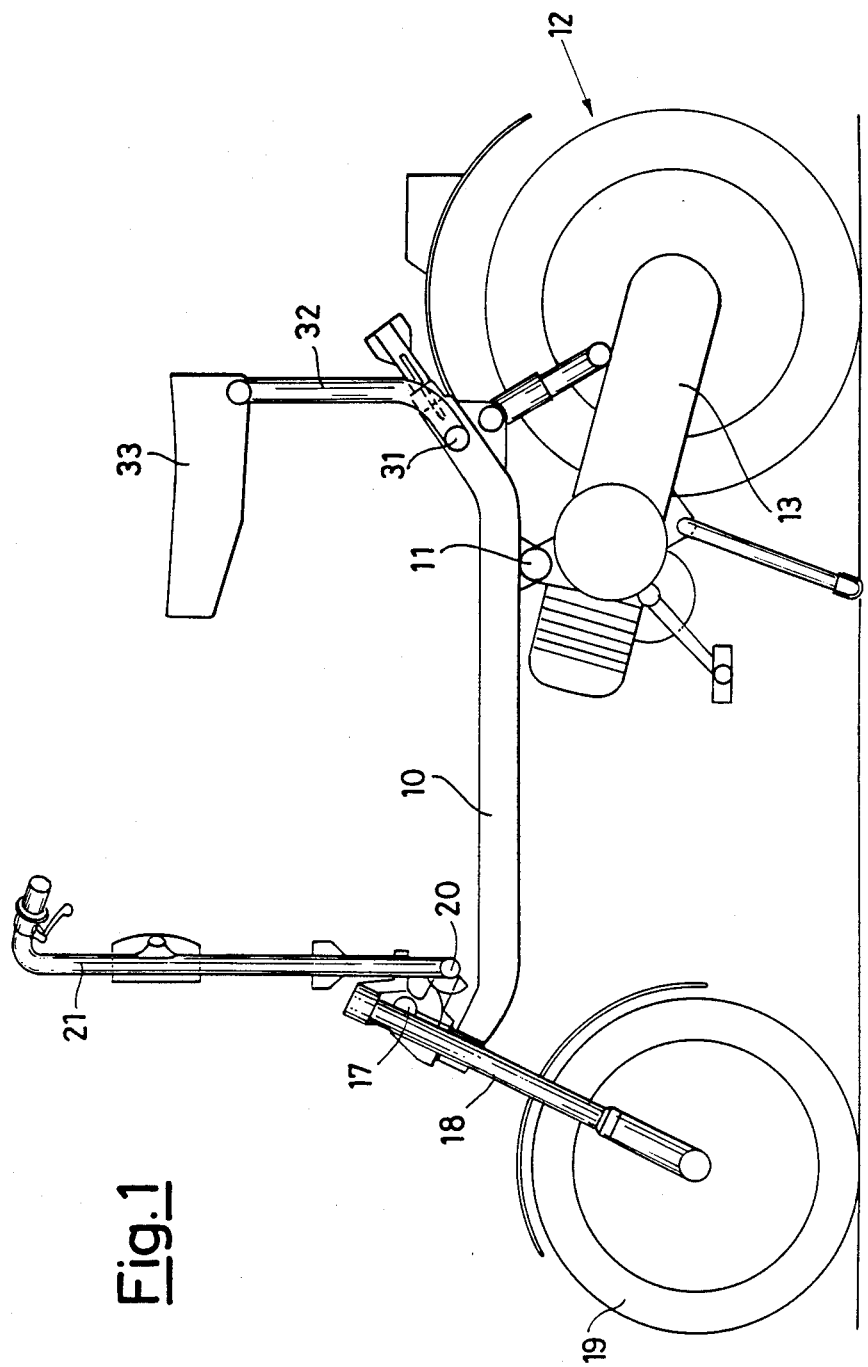
FIGS. 1 and 2 show general diagrammatic views of a vehicle according to the invention in positions of running trim and with reduced overall dimensions respectively.
Figure 2:
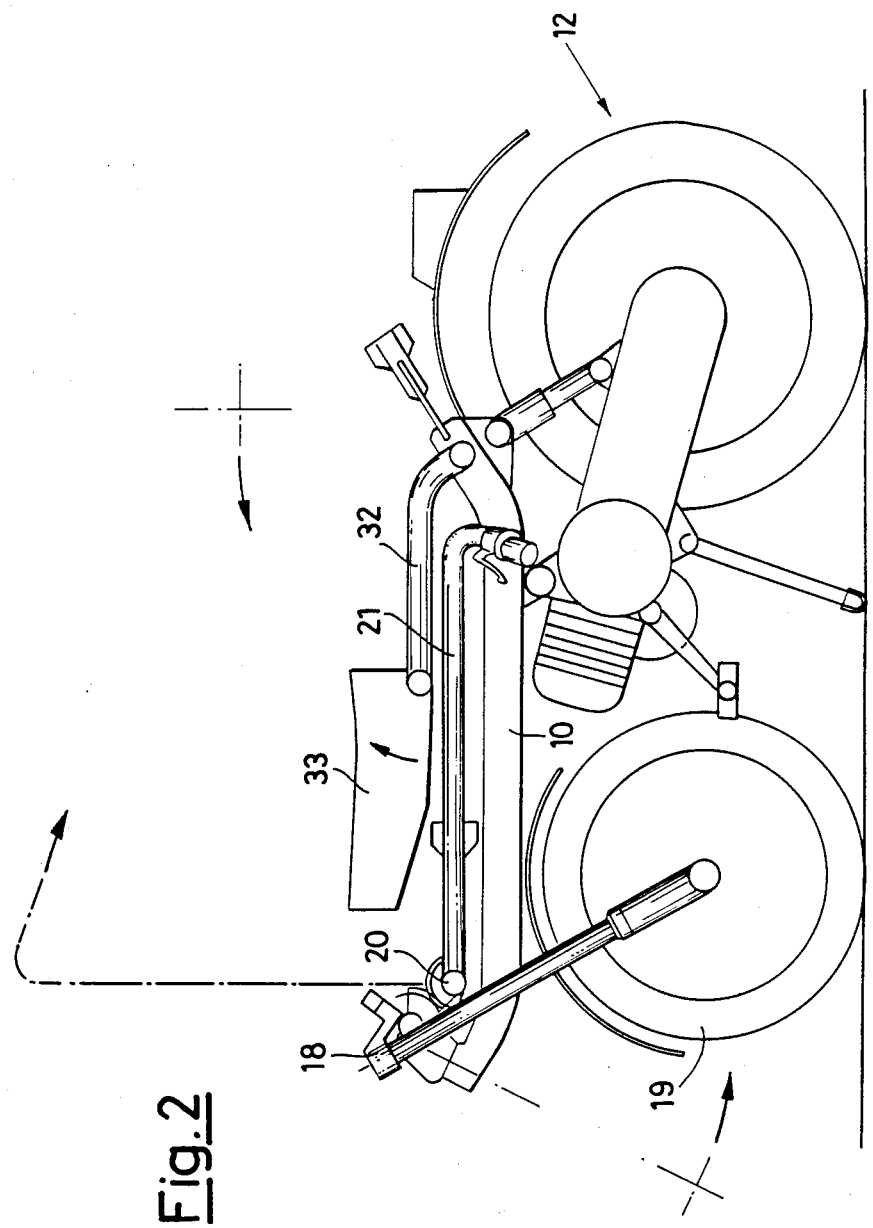
Figure 3:
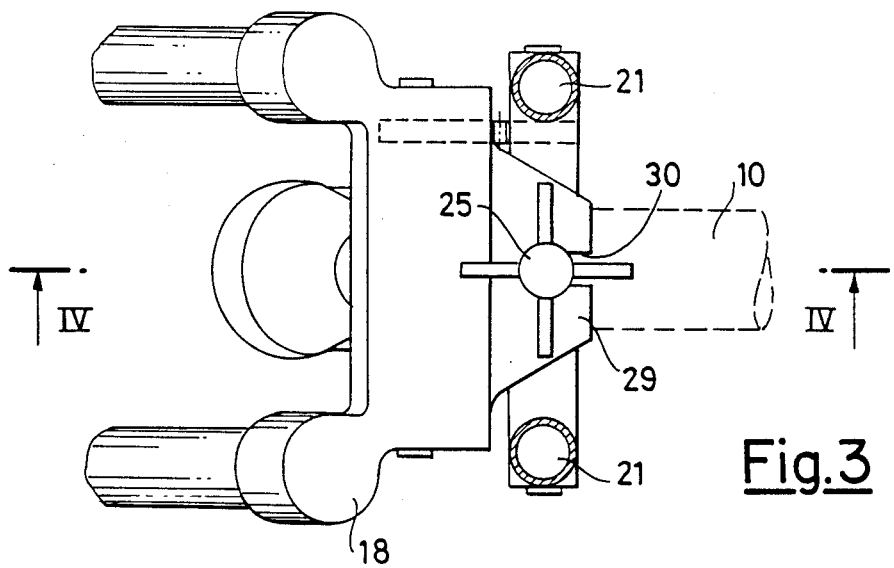
FIG. 3 is a top view along the direction III indicated in FIG. 4 of a vehicle detail of FIG. 1.
Figure 5:
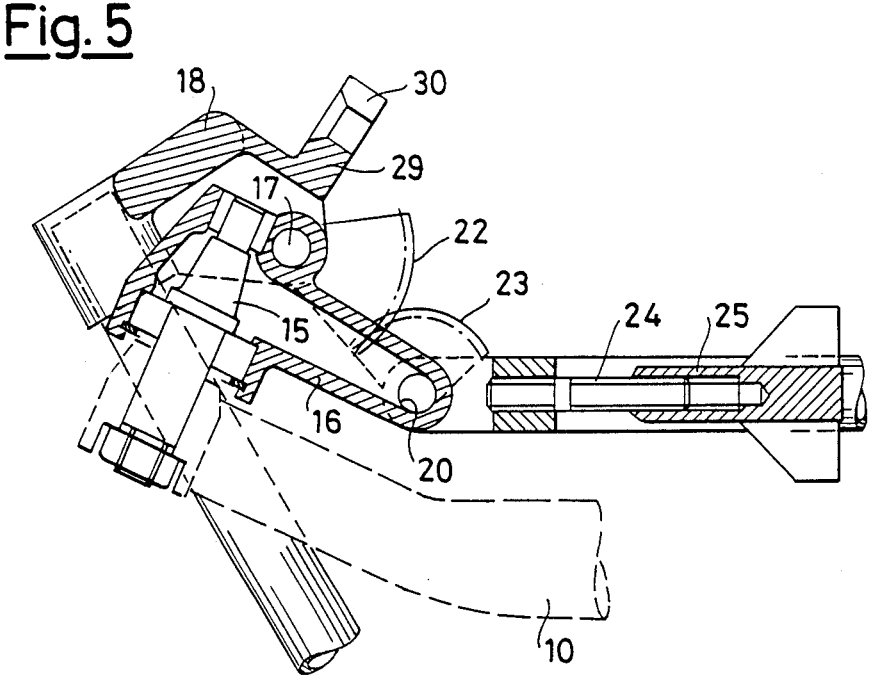
Figure 6:
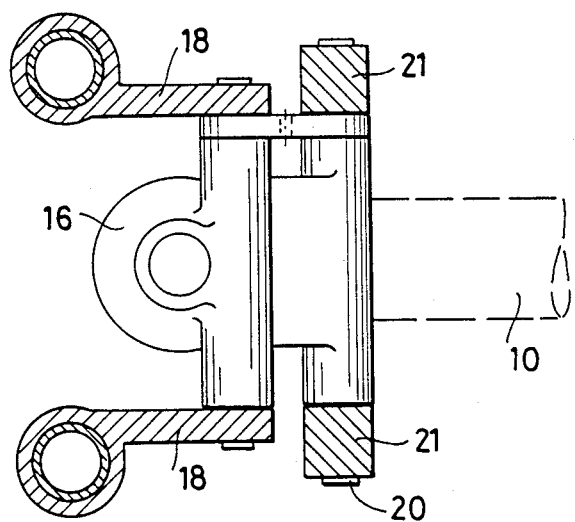
FIG. 6 is a partial sectional view along FIG. 4 plane of trace VI—VI.

When the vehicle is in position of FIG. 1, by unscrewing the bolt or wing nut 25 the fork and handle-bar folding motion is allowed; and when the handle-bar 21 is swung clockwise in FIG. 1 about hinge 20 to its collapsed or folded position as shown in Fig. 2 a fork rotation is simultaneously induced by sectors 22 and 23 meshing, and the fork 18 is thus caused to be swung counterclockwise in FIG. 1 about hinge 17 to its collapsed position as shown in FIG. 2, and thus carries the front wheel towards the vehicle center, and up to its collapsed position underneath the frame as shown in FIG. 2 and FIG. 5, where the folded position assumed by the various parts is better visible in detail. During and after the overall dimensions reduction the vehicle remains supported on the trestle on the rear wheel: and its back part keeps its trim and look.

Consequently the operator has not to substain weights and also the scarcely experienced one can realize the necessary manoeuvres.

Also the support 32 and saddle 33 may next be collapsed as shown again in FIG. 2. The overall dimension reducing mechanism is not here described in detail, it being a matter of extremely simple connections that can take varied configurations. It's only necessary indeed to foresee that the saddle be supported with its rest in an articulated and slidable way, blockable by any means into operative use position.

Figure 7:
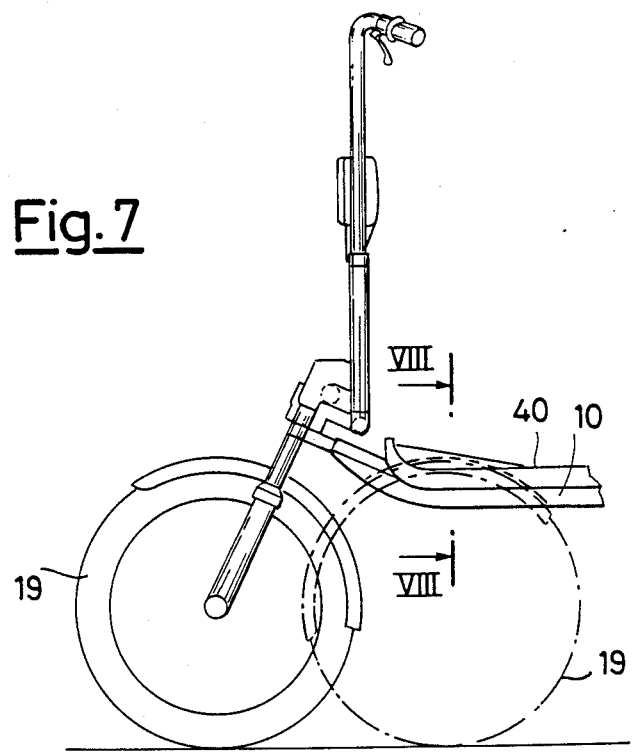
FIG. 7 shows a partial side view of a different motor-cycle embodiment analogous to that of FIG. 1
Figure 8:
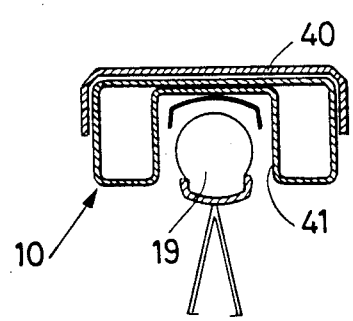
FIG. 8 is a second according to the FIG. 7 plane of trace VIII—VIII.

According to the objects of the invention, the structure deformability is obtained without limitations and alterations not admissible by the frame structure. It's sufficient that the frame allows only to accommodate the front wheel in the contracted position. This can also be accomplished by foreseeing a corresponding frame seat. It can in particular maintain the low floor board configuration, often considered advantageous in light motor-cycles. An embodiment example of this concept is illustrated in FIGS. 7 and 8 where a motor-cycle having a general configuration corresponding to that of the preceding figures in which the frame 10 shows a low floor board plane 40 showing a substantially U shaped section at least in the zone where the wheel sets in contracted position, so forming a seat 41 that partially receives the same wheel. In this way the floor board top plane results somewhat low. One should notice that, according to the object of the invention, the fork 18 folding backwards on the vehicle leads to a substantial reduction in its length, whereas the handle-bar folding causes a corresponding vehicle front part reduction in height. It has been shown in the embodiment example how the handle-bar and fork movements are interdependent by virtue of a simple connection among the parts consisting of the gear sectors 22 and 23. The technician understands how this interconnection may have extremely various forms of by the adoption of mechanical equivalents foreseeing gear articulated levers and the like.

The solution shown is particularly advantageous because constructively simple, and because apt to accomplish by simple sectors radii dimensioning, the proper ratio between the handle-bar and fork overturning angles, so that both these parts go to set simultaneously respectively in operative position. Besides the connection between handle-bar and fork it's not strictly necessary because both parts may be displaced by hand between their extreme positions, corresponding to the vehicle running trim or folded position. The existences of such a connection is nevertheless particularly advantageous, because it allows the operator to bring also the fork into a contracted vehicle position, by a simple action on the handle-bar.

Likewise the handle-bar and fork blocking means can have various configurations into respective correct positions required by the vehicle gear, exemplified in the described embodiment by the screw tie rod 24-25 acting directly between the two parts, blocking them absolutely safely, to set up a rigid system with the hub. As above mentioned, the embodiment explained in the enclosed drawings must be understood as purely illustrative of how the principles of the present invention can be practically carried out and many variations and improvements can be introduced without going out of the scope of the present invention.

I claim:

1. A two or three-wheeled vehicle having a single front steering-wheel, and comprising
   a frame having supported thereon adjacent its forward end a rotatable steering hub,
   a handle-bar connected to said hub for imparting rotation thereto, and being pivotal relative to said hub between collapsed and upright positions, respectively,
   a fork supporting the front wheel of the vehicle on said hub for steering by said handle-bar, and being pivotal relative to said hub between collapsed and upright positions, respectively,
   said handle-bar and said fork being pivotal along axes transverse to the hub rotation axis and parallel to the front wheel axis, and
   means interconnecting said fork and said handle-bar and operative when the handle-bar is pivoted to its collapsed position, simultaneously to cause said fork to be swung to its collapsed position.

2. A vehicle according to claim 1, characterized in that said means comprises two toothed wheel sectors meshing with one another and each being secured, respectively, to said handle-bar and to said fork, and being rotatable coaxially of the respective pivotal axes of said handle-bar and fork..

3. A vehicle according to claim 1, characterized in that said interconnecting means includes means for releasably locking said handle-bar and said fork in their upright positions.

4. A vehicle according to claim 3, wherein said releasable locking means releasably secures together registering portions of said fork, and said handle-bar, respectively, when said fork and handle-bar are in their upright positions.

5. A vehicle according to claim 1, wherein said handle-bar in its collapsed position is disposed in a substantially horizontal plane overlying said frame, and said fork in its collapsed position is tucked under the forward end of said frame.

* * * * *

UNITED STATES PATENT OFFICE
CERTIFICATE OF CORRECTION

Patent No. 4,830,133          Dated May 16, 1989

Inventor(s) Bruno Gaddi

It is certified that error appears in the above-identified patent and that said Letters Patent is hereby corrected as shown below:

On the title page, after paragraph "[22]" insert the following paragraph:

--[30] Foreign Application Priority Data
Oct. 1, 1986 [IT] Italy.....21869 A/86--.

Signed and Sealed this

Sixteenth Day of January, 1990

Attest:

JEFFREY M. SAMUELS

Attesting Officer    Acting Commissioner of Patents and Trademarks